United States Patent [19]

Wagensonner et al.

[11] 4,025,935
[45] May 24, 1977

[54] CAMERA WITH MEANS FOR MAINTAINING A CONSTANT DC SUPPLY VOLTAGE

[75] Inventors: Eduard Wagensonner, Aschheim; Volkmar Stenzenberger, Unterhaching, both of Germany

[73] Assignee: AGFA-Gevaert, A.G., Leverkusen, Germany

[22] Filed: Mar. 4, 1976

[21] Appl. No.: 663,817

[30] Foreign Application Priority Data

Mar. 5, 1975 Germany .................. 2509497

[52] U.S. Cl. ........................... 354/173; 320/13; 323/15; 323/DIG. 1
[51] Int. Cl.² .................. G03B 1/00; G05F 1/62
[58] Field of Search .............. 352/166; 354/173; 320/13; 323/15, DIG. 1

[56] References Cited

UNITED STATES PATENTS

| 3,792,341 | 2/1974 | Kline | 323/DIG. 1 X |
| 3,983,472 | 9/1976 | Morris | 323/DIG. 1 X |
| 3,995,291 | 11/1976 | Momose | 354/173 |

Primary Examiner—L. T. Hix
Assistant Examiner—Michael L. Gellner
Attorney, Agent, or Firm—Michael J. Striker

[57] ABSTRACT

The exposure control circuit of the camera requires a supply voltage which must have an amplitude exceeding a predetermined minimum amplitude. The camera battery is subject undesired decreases in battery output voltage. A transverter circuit has an input connected to the battery and in response to the battery output voltage furnishes a DC output voltage to the exposure control apparatus when the battery output voltage has an amplitude less than the predetermined minimum amplitude. A control circuit is responsive to the voltage applied to the exposure control apparatus and controls a controllable impedance connected between the transverter input and the battery so that the supply voltage applied to the exposure control apparatus remains constant at a value just exceeding the predetermined minimum amplitude when the battery output voltage is too low and disconnects the transverter circuit from the battery when the battery output voltage exceeds the predetermined minimum amplitude. In the latter case a diode is provided for applying the battery output voltage directly to the exposure control circuit.

11 Claims, 1 Drawing Figure

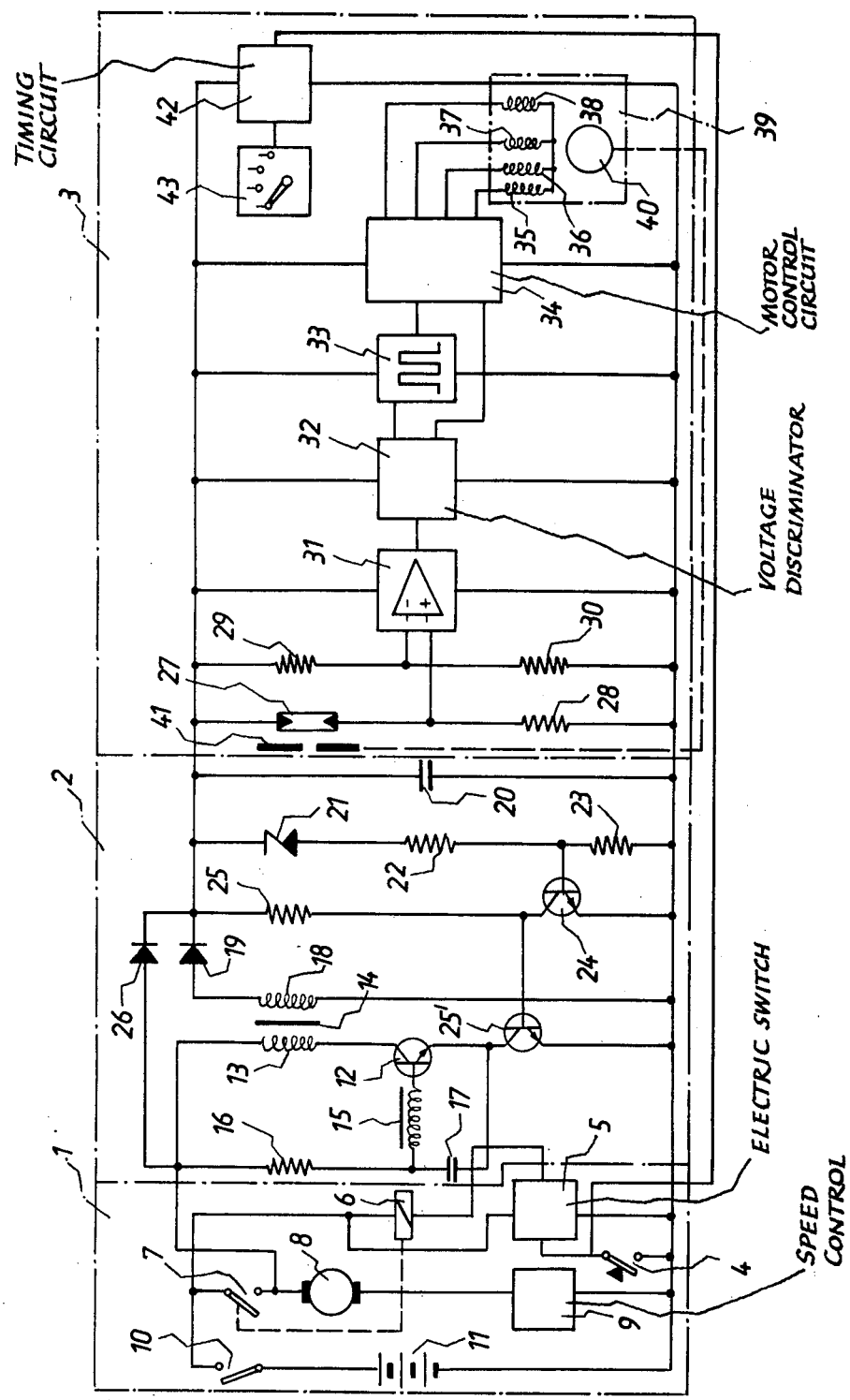

CAMERA WITH MEANS FOR MAINTAINING A CONSTANT DC SUPPLY VOLTAGE

BACKGROUND OF THE INVENTION

The present invention relates to photographic or motion picture cameras which have an exposure conrol apparatus which is properly operable only when the energizing voltage applied thereto has an amplitude which is somewhere in the range between a predetermined minimum amplitude and a predetermined maximum amplitude. These cameras include batteries whose output voltage is subject to undesired decreases.

In photographic and motion picture cameras the mechanical control and regulating arrangements are being replaced by electronic circuits on a larger and larger scale. Such exposure control circuits operate adequately only when the energizing voltage applied thereto exceeds a predetermined minimum amplitude and is less than a predetermined maximum amplitude. However the output voltages of the battery tend to decreases during its lifetime. Even for a new battery, the output voltage may decrease considerably under load particularly when the temperature is low. Exposure control circuits and in particular such circuits utilizing MOS components thus may not operate properly when the energizing voltage applied thereto is a directly applied battery output voltage.

SUMMARY OF THE INVENTION

It is an object of the present invention to furnish an energizing voltage to the exposure control apparatus in a motion picture or photographic camera which remains within the predetermined limits required for proper operation of the exposure control apparatus even when the battery voltage has an amplitude less than the required predetermined minimum amplitude.

The present invention resides in a camera having exposure control apparatus operable only upon receipt of an energizing voltage having an amplitude between a predetermined minimum amplitude and a predetermined maximum amplitude. The camera further has a battery which is subject to undesired decreases in battery output voltage. The invention comprises transverter means for receiving an input DC voltage and furnishing an output DC voltage having an amplitude exceeding the amplitude of said input DC voltage in response thereto, said output DC voltage having an amplitude at least equal to said predetermined minimum amplitude in response to input DC voltages exceeding a predetermined minimum driving voltage. The invention further comprises control circuit means connected to said battery and to said transverter means, for applying at least a portion of said battery output voltage to said transverter means to constitute sand input DC voltage when the amplitude of said battery output voltage is less than said predetermined minimum amplitude. In this manner the transverter means furnish an output DC voltage constituting said supply voltage when the amplitude of the battery output voltage is less than the predetermined minimum amplitude required for proper operation of the exposure control circuit.

In a preferred embodiment of the present invention the control means are operative to maintain the output DC voltage at a value substantially equal, but slightly greater than said predetermined minimum amplitude.

In a further preferred embodiment, shunt means are provided for connecting the battery output voltage directly to the exposure control means and bypassing the transverter means when the battery output voltage exceeds the predetermined minimum amplitude.

In a further preferred embodiment of the present invention the control means comprise first control means including a voltage divider having a threshold element for furnishing a voltage divider signal at a voltage divider tap only when the voltage energizing the exposure control circuit (either the battery voltage or the output DC voltage of the transverter means) has an amplitude exceeding the predetermined minimum amplitude. The voltage divider signal is applied to the base of a transistor which has an emitter-collector circuit forming part of a voltage divider connected in parallel with the aforementioned voltage divider. The voltage at the collector of said transistor is applied to the base of a transistor constituting controllable impedance means. The emitter-collector circuit of the latter is connected between the battery and the input of the transverter means so that the input DC voltage of the transverter means is equal to the battery output voltage minus the emitter-collector impedance drop across the controllable impedance. The control circuit means operate to increase the drop with increases in the output DC voltage of the transverter means, thereby maintaining the output DC voltage substantially constant. In this manner the transverter means are operative to furnish the proper supply voltage to the exposure control means so that adequate pictures can be taken even when the battery output voltage has dropped. This also removes the danger of unsatisfactory photography at low temperatures. Also, it is possible to continue filming until the end of the roll without exchanging batteries even when the battery output voltage has dropped considerably.

A further danger that is averted is a possible overloading of the exposure control circuit for increases of the supply voltage above the predetermined maximum amplitude. The control means serve to regulate the voltage to a voltage lower than this predetermined maximum amplitude and therefore constitute in a sense a safety circuit. Further of course as long as the battery voltage remains above a predetermined minimum voltage required to operate the transverter means, the proper supply voltage will be applied to the exposure control circuit.

By providing the bypass which shunts the transverter means and applies the battery output voltage directly to the exposure control circuit when the battery output voltage has an amplitude exceeding the predetermined minimum amplitude, the power loss due to the transverter means is minimized.

In a preferred embodiment of the present invention the transverter means comprises a chopper which includes a transistor, a transformer having a primary winding connected to said transistor and having a secondary winding furnishing an AC voltage, and a rectifier connected to the secondary winding for furnishing the output DC voltage to the exposure control means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE is a preferred embodiment of the present invention.

DESCRIPTION OF THE PREFERRED EMBODIMENT

A preferred embodiment of the present invention will now be described with reference to the drawing.

In the FIGURE, reference numeral 1 refers to a drive circuit for the film transport of a motion picture camera, reference numeral 2 to transverter means and reference numeral 3 to an exposure control apparatus.

The drive means 1 comprise a manually operable release switch or button 4 which controls an electronic switch 5 which in turn energizes a relay 6. Relay 6 has a contact 7 which is in the energizing circuit of the film transport motor 8 to which is also connected a speed regulator 9. A main operating switch 10 is connected in series with battery 11. All these components in box 1 of the FIGURE are well-known elements which are shown here only to clarify the connection to the elements constituting the present invention.

The transverter means of the present invention are shown in box 2. It will be noted that the input to the transverter means is directly connected to motor 8 and is connectable to the battery only upon operation of switch 7. The transverter means comprise a chopper circuit which includes a transistor 12 herein referred to as a chopper transistor. The primary winding 13 of a transformer 14 is connected in series with the emitter-collector circuit of transistor 12. A first secondary winding 15 of transformer 14 is connected to the base of transistor 12 and is further connected in series with a resistor 16. A capacitor 17 is connected from the common point of resistor 16 and secondary winding 15 to the emitter of transistor 12. A second secondary winding 18 of transformer 14 furnishes an AC voltage which is rectified by rectifier 19 which is connected to winding 18. The voltage from the cathode of rectifier 19 to the negative side of the battery is herein referred to as the output DC voltage of the transverter means. It constitutes the supply voltage for the exposure control circuit 3. A capacitor 20 serves as a smoothing capacitor for the output DC voltage. The voltage across capacitor 20 is of course a DC voltage. A voltage divider including a Zener diode 21, herein referred to as a threshold element, connected in series with a resistor 22 and a further resistor 23 is connected in parallel with capacitor 20. The tap of the voltage divider, namely the common point of resistor 22 and resistor 23 is connected to the base of a transistor 24 whose emitter-collector circuit is connected in series with a resistor 25. The series combination of the resistor 25 and the emitter-collector circuit of transistor 24 is connected in parallel with capacitor 20. The above-mentioned voltage divider, resistor 25 and transistor 24 constitute first control means. The voltage at the collector of transistor 24 is applied to the base of a transistor 25' whose emitter-collector circuit is connected in series with the emitter-collector circuit of transistor 12. The emitter-collector circuit of transistor 25' constitutes a controllable impedance. A diode 26 connects the output of battery 11 directly to the output of the transverter means. Diode 26 is herein referred to as shunt means.

The exposure-control apparatus in box 3 of the FIGURE includes a voltage divider having a light sensitive element 27 connected in series with a resistor 28. Further, it comprises a voltage divider having a resistor 29 and a resistor 30. The common point of the light sensitive element 27 and resistor 28 is connected to the direct input of a differential amplifier 31, while the common point of resistors 29 and 30 is connected to the inverting input of said differential amplifier. The output of differential amplifier 31 is connected to the input of a voltage discriminator circuit 32. Voltage discriminator circuit 32 has a first output connecting it to a pulse generator 33. The first output of the voltage discriminator circuit 32 is energized when the diaphragm is not at the correct opening for the prevailing light conditions. It causes the pulses from the pulse generator 33 to be applied to a stepmotor control circuit 34. The voltage discriminator circuit 32 furnishes a further output signal which determines the direction in which the diaphragm is to be operated, namely either the opening or the closing direction. This signal is also applied to the stepmotor control circuit 34. From the stepmotor control circuit four output lines connect to corresponding windings 35, 36, 37 and 38 of a stepmotor 39. The armature 40 of stepmotor 39, through suitable gearing, adjusts the diaphragm 41 which also controls the amount of light falling on the photosensitive element 27. The circuit in box 3 also comprises a timing circuit 42 which is also energized by the supply voltage and which, for special types of photography as selected in selection circuit 43 by the photographer controls the operation of the above-mentioned electronic switch 5. The special types of photography selectable by the selection switch 43 may include self-timers, single frame photography in a motion picture camera, time lapse photography, etc. The exposure control circuit shown in block 3 is also well known in the art and is described, for example, in U.S. Pat. No. 3,813,680. Again, it is described here only to illustrate its interconnection with the transverter means and the control means (box 2) which constitute the present invention.

It must be noted that the battery voltage is of course substantially higher when only the electronic circuitry is connected thereto, that is when motor 8 is not running. It is assumed that even when the battery output voltage has a amplitude less than the predetermined minimum amplitude, the battery output voltage will still exceed the predetermined minimum driving voltage which is required both for operating the motor and to serve as an adequate input voltage to the transverter means so that the transverter means are capable to create an output DC voltage having a sufficient amplitude.

The above-described equipment operates as follows:

Let it be assumed that the output voltage of the battery has decreased to a relatively low value. It is further to be assumed that for this value relay 6 and motor 8 may still be operated. Therefore, closure of the main operating switch 10 and closing of the relay contact 7 causes the battery 11 to be connected to the transverter means. The transverter means of course comprise the above-described chopper circuit which oscillates at its characteristic frequency and generates an output DC voltage which exceeds the input DC voltage. The voltage applied across the voltage divider including Zener diode 21 is too small to cause this Zener diode to conduct. Therefore transistor 24 is also blocked, causing a high positive voltage to be applied to the base of transistor 25', causing this transistor to be fully conductive. Almost the complete battery output voltage (the complete battery output voltage minus the very small drop across the emitter-collector circuit of transistor 25' at saturation) is applied to the transverter means to constitute the input DC voltage. The circuit is so designed that when the battery output voltage is the predetermined minimum driving voltage at which any circuit operation can still take place, and this voltage is fully applied to constitute the input DC voltage to the transverter means, then the transverter means will furnish an output DC voltage having an amplitude equal to the predetermined minimum amplitude required for successful operation of the exposure regulating circuit. At this point Zener diode 21 becomes conductive so that a voltage drop is developed across resistor 23. This, when it exceeds the base-emitter threshold voltage of transistor 24 causes this transistor to become conductive. The impedance of the emitter-collector circuit of transistor 25' therefore commences to increase somewhat. For battery output voltages which exceed the predetermined minimum voltage the voltage drop across resistor 23 tends to increase causing transistor 24 to become more and more conductive. This in turn causes a greater voltage drop to be developed across the emitter-collector circuit of transistor 25'. In particular, in a preferred embodiment of the present invention, the individual elements are so designed that the increase in voltage drop across the emitter-collector circuit of transistor 25' equals the difference between the actual battery output voltage and the predetermined minimum voltage. Under these conditions the input DC voltage to the transverter means remains constant, causing the output DC voltage also to remain constant.

If the output voltage of battery 11 exceeds this constant output DC voltage, (the latter being equal to the predetermined minimum voltage required for correct operation of the exposure regulating circuit) then Zener diode 21 becomes fully conductive, transistor 24 is saturated, and transistor 25' is completely blocked. This blocks the current supply to the chopper circuit, causing the chopper circuit to become inoperative. Substantially simultaneously, the battery output voltage is applied through diode 26, which becomes conductive, to the exposure regulating circuit. It is thus seen that in accordance with the present invention the transverter means are active only when the battery output voltage has decreased below the predetermined minimum value required for successful operation of the exposure control circuit. At all other times the transverter circuit of the present invention is inoperative and therefore does not require any current.

While the invention has been illustrated and described as embodied in a particular transverter and control circuit, it is not intended to be limited to the details shown, since various modifications and circuit changes may be made without departing in any way from the spirit of the present invention.

Without further analysis, the foregoing will so fully reveal the gist of the present invention that other can be applying current knowledge readily adapt it for various applications without omitting features that, from the standpoint of prior art, fairly constitute essential characteristics of the generic of specific aspects of this invention.

What is claimed as new and desired to be protected by Letters Patent is set forth in the appended claims:

1. In a camera having a battery subject to undesired decreases in battery output voltage and having exposure regulating apparatus operative only upon energization by a supply voltage having a supply voltage amplitude between a predetermined minimum amplitude and a predetermined maximum amplitude, equipment for creating said supply voltage independent of said undesired decreases of said battery output voltage, comprising, in combination, transverter means for receiving an input DC voltage and furnishing an output DC voltage exceeding said input DC voltage in response thereto, said output DC voltage having an amplitude at least equal to said predetermined minimum amplitude in response to input DC voltage exceeding a predetermined minimum driving voltage; and control circuit means connected to said battery and said transverter means for applying at least a portion of said battery output voltage to said transverter means to constitute said input DC voltage when the amplitude of said battery output voltage is less than said predetermined minimum amplitude, whereby said transverter means furnishes an output DC voltage constituting said supply voltage when the amplitude of said battery output voltage is less than said predetermined minimum amplitude.

2. Equipment as set forth in claim 1, wherein said control circuit means comprise first control means connected to said battery and said transverter means for furnishing a first control signal corresponding to the one of said battery output voltage and said output DC voltage having the greater amplitude, and second control means connected to said first control means for varying said portion of said battery output voltage applied to said transverter means as a function of said first control signal.

3. Equipment as set forth in claim 2, wherein said control circuit means vary said portion of said battery output voltage applied to said transverter means in such a manner that said output DC voltage remains constant at an amplitude at least equal to said predetermined minimum amplitude.

4. Equipment as set forth in claim 3, wherein said second control means comprise controllable impedance means interconnected between said battery and said transverter means for blocking the application of said battery output voltage to said transverter means in response to a first correction signal signifying a battery output voltage having an amplitude exceeding said predetermined minimum amplitude.

5. Equipment as set forth in claim 4, wherein said transverter means furnishes said output DC voltage at a transverter output; wherein said exposure control apparatus has an exposure control input for receiving said supply voltage; further comprising means for connecting said transverter output to said exposure control input, and shunting circuit means connected between said battery and said exposure control input for bypassing said transverter means when said battery output voltage has an amplitude exceeding said predetermined minimum amplitude.

6. Equipment as set forth in claim 7, wherein said shunting means comprises a diode.

7. Equipment as set forth in claim 1, wherein said transverter means comprise a transistorized chopper including a chopper transistor, a transformer having a primary winding connected to said chopper transistor and having a secondary winding for furnishing an AC voltage, and a rectifier connected to said secondary winding and said exposure control apparatus for rectifying said AC voltage and furnishing said output DC voltage to said exposure control apparatus.

8. Equipment as set forth in claim 7, further comprising shunt means interconnected between said battery and said exposure control apparatus for bypassing said transverter means and applying said battery output voltage directly to said exposure control apparatus when said battery voltage has an amplitude exceeding said predetermined minimum amplitude.

9. Equipment as set forth in claim 8, wherein said control means comprise voltage divider means connected in parallel with said exposure control apparatus and including a threshold element for furnishing a voltage divider signal corresponding to the voltage energizing said exposure control apparatus at a voltage divider tap, and controllable impedance means having a control electrode connected to said voltage divider tap and a controllable impedance circuit connected between said battery and said chopper transistor for changing the voltage applied to said chopper transistor in dependence upon said voltage divider signal and in a direction for maintaining said output DC voltage constant.

10. Equipment as set forth in claim 9, wherein said threshold element is a Zener diode.

11. Equipment as set forth in claim 1, wherein said camera is a motion picture camera having a film transport motor; further comprising switch means operable to simultaneously connect said film transport motor and said transverter means to said battery.

* * * * *